(12) United States Patent
Borges et al.

(10) Patent No.: US 6,350,074 B1
(45) Date of Patent: Feb. 26, 2002

(54) SPHERICAL CLEVIS ASSEMBLY

(75) Inventors: John Silva Borges, La Mirada; Kevin David Boggs, Huntington Beach; Vail Rory Trevisanut, Redondo Beach; Phillip A. Goldberg, Harbor City; Richard Arthur Zapata, Los Angeles, all of CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/093,279

(22) Filed: Jun. 8, 1998

(51) Int. Cl.[7] .................................................. F16C 11/06
(52) U.S. Cl. .............................. 403/79; 403/78; 403/158
(58) Field of Search .............................. 403/79, 78, 57, 403/157, 158, 112, 113

(56) References Cited

U.S. PATENT DOCUMENTS

| | | | |
|---|---|---|---|
| 873,561 A | | 12/1907 | Langer |
| 1,166,206 A | | 12/1915 | Heaslet |
| 2,022,801 A | * | 12/1935 | Conner ........................ 403/302 |
| 2,405,148 A | * | 8/1946 | Keahey ........................ 403/122 |
| 2,942,291 A | | 6/1960 | Fling |
| 3,441,299 A | | 4/1969 | Pfaar |
| 3,567,262 A | | 3/1971 | Szkaradek et al. |
| 3,794,392 A | | 2/1974 | Scott |
| 4,139,245 A | | 2/1979 | McCloskey |
| 5,080,243 A | | 1/1992 | Lynch, Jr. et al. |

FOREIGN PATENT DOCUMENTS

DE          G8665B/32       *  9/1978

* cited by examiner

Primary Examiner—Lynne H. Browne
Assistant Examiner—Kenneth Thompson
(74) Attorney, Agent, or Firm—Terry J. Anderson; Karl J. Hoch, Jr.

(57) ABSTRACT

A spherical clevis assembly constructed as a generally U-shaped member having two generally parallel opposing arms and a base. Two opposing inwardly disposed mounting members each having a spherical portion are situated in a respective aperture of the respective arm of the U-shaped member. Each such aperture has a sidewall-defined entry of a diameter less than an adjacent curvature of the spherical portion of the mounting member to thereby permit the spherical portion to ride upon the sidewall-defined entry and be movable in axes in accord with the adjacent curvature of the spherical portion. A pin member extends between the mounting members to receive connected components whose mounting aperture surrounds the pin member as conventionally accomplished. Since each end of the pin member is situated within a respective mounting member, the arc movement and subsequent multiplanar movements translate to the pin member. Because of this multiplanar movement, two component apertures can be accommodated by the pin member such that each such component can experience an independent movement pattern.

6 Claims, 1 Drawing Sheet

SPHERICAL CLEVIS ASSEMBLY

FIELD OF THE INVENTION

This invention relates in general to mechanical connectors, and in particular to a spherical clevis assembly having spherical mounting members at opposing arms and between which a pin extends such that the pin and any structures secured thereto have multi-planar movement capability in accord with spherical movement range of the mounting members.

BACKGROUND OF THE INVENTION

Present-day clevis assemblies generally are constructed as U-shaped yoke structures between whose ends a lever, hook, second clevis, etc. can be pinned or otherwise secured. In one configuration, the distance between the two arms of the U-shaped yoke is barely greater than that of an item to be secured on a pin extending between the arms, while in another configuration a generally exposed pin extends between the arms and can accept one or more components whose width at the pin site is sufficiently narrow to be accommodated between the arms of the yoke. In either type of connection, however, placement of the pin itself is fixed. Such construction therefore precludes any arced lateral movement of a component retained to the pin, other than movement due to the diameter of a component hole surrounding the pin or of accidental or intentional distortional bending of the component. In any event, the pin of the clevis remains in a fixed state unless broken or otherwise contorted between the parallel arms. When such destruction occurs, of course, the damaged clevis generally is no longer acceptable as a connector. Additionally, component bending may not be acceptable because of potential structural failure caused by crystal chain fracture or the like in the connected component.

Because the above-described traditional clevis construction only permits attached-component movement when accompanying clevis movement can complimentarily occur, it is apparent that no more than one component can be connected if movement versatility of that component is desired. As a result, multiple devises must be used when a plurality of individual components must be connectively associated with each other. Such multiplicity of clevis devices adds weight and spatial requirements that many times are not tolerable. As a result, a need is present for a clevis connector assembly in which more than one component can be connected, yet wherein each component has a degree of individual movement capabilities without destroying or otherwise harming the component or the clevis assembly.

In view of the above considerations, a primary object of the present invention is to provide a spherical clevis assembly capable of accommodating more than one connector component.

Another object of the present invention is to provide a spherical clevis assembly having a limited spherical movement available to connected components.

These and other objects of the present invention will become apparent throughout the description thereof which now follows.

SUMMARY OF THE INVENTION

The present invention is a spherical clevis assembly constructed as a generally U-shaped member having two generally parallel opposing arms and a base. Two opposing inwardly disposed mounting members each having a spherical portion are situated in a respective aperture of the respective arm of the U-shaped member. Each such aperture has a sidewall-defined entry of a diameter less than an adjacent curvature of the spherical portion of the mounting member to thereby permit the spherical portion to ride upon the sidewall-defined entry and be movable in axes in accord with the adjacent curvature of the spherical portion. A pin member extends between the mounting members to receive connected components whose mounting aperture surrounds the pin member as conventionally accomplished. Preferably, the spherical portions of the mounting members, in cooperation with appropriately-sized respective aperture entries, can provide arc movement from about 5° to about 15°. Since each end of the pin member is situated within a respective mounting member, the arc movement and subsequent multiplanar movement ranges translate to the pin member. Because of this multiplanar movement, more than one, but preferably only two, component apertures can be accommodated by the pin member such that each such component can experience an independent movement pattern.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
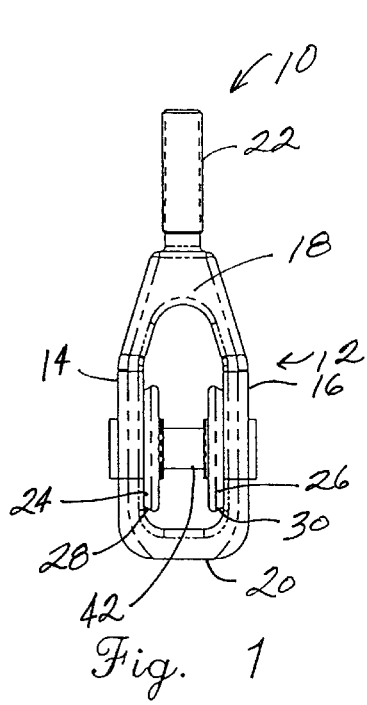
FIG. 1 is a front elevation view of a spherical clevis assembly.
Figure 2:
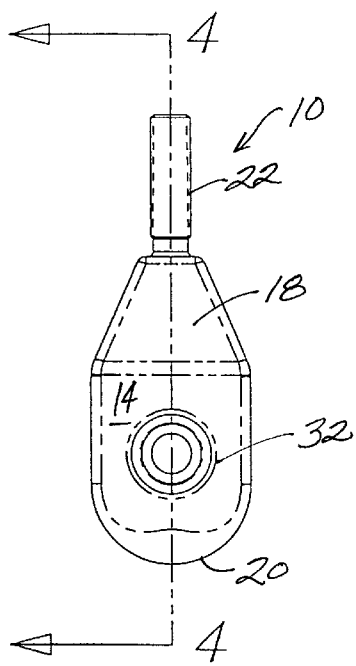
FIG. 2 is a side elevation view of the clevis assembly of FIG. 1.
Figure 3:
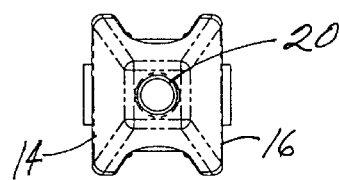
FIG. 3 is a bottom plan view of the clevis assembly of FIG. 1.

Referring first to FIGS. 1 and 2, a spherical clevis assembly 10 is shown. The assembly 10 includes a generally U-shaped member 12 having two generally parallel opposing arms 14, 16, and a base 18 joining the arms 14, 16. The end 20 opposite the base 18 likewise can be closed as shown and can be configured with a rectangular or square cross section as shown in FIG. 3. A threaded rod 22 extends outwardly from the base 18 for conventional connection to an associated structure (not shown) as may be necessary to accomplish a connection.

Figure 4:
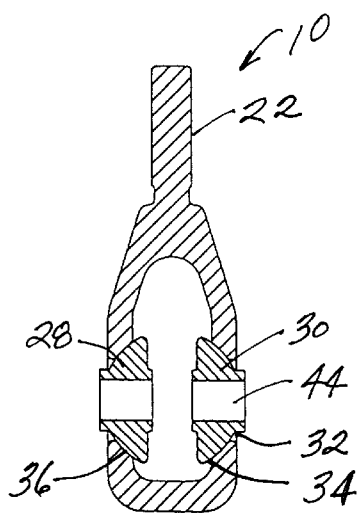
FIG. 4 is a front elevation view in section along line 4—4 of FIG. 2.
Figure 5:
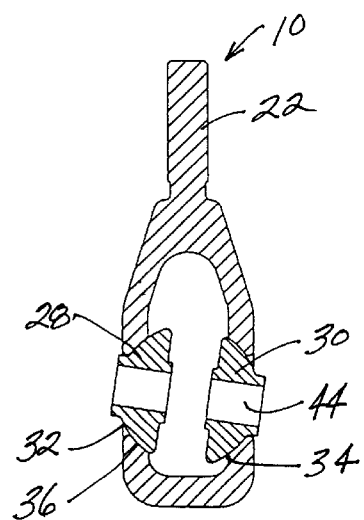
FIG. 5 is a front elevation view similar to FIG. 4 except with repositioned mounting members.

Referring now to FIGS. 1, 2, 4 and 5, two respective opposing inwardly disposed mounting members 24, 26 are disposed at the arms 14, 16. Each mounting member 24, 26 has a spherical portion 28, 30, while each arm 14, 16 of the U-shaped member 12 has an aperture 32 defined by a side wall-defined entry 34 of a diameter less than an adjacent curvature of the spherical portion 28, 30 of the mounting members 24, 26. As shown in FIGS. 4 and 5, the sidewall 36 of the aperture 32 can, itself, be formed as an arc complimentary in curvature to the spherical portions 28, 30. A pin member 42 (FIG. 1 only) extends between the mounting members 24, 26, with each end of the pin member 42 retained within a respective mounting member 24, 26. A bore 44 extends through the axis of each mounting member 24, 26 to thereby permit conventional placement, retention and removal of the pin member 42 at each mounting member 24, 26.

As earlier described, each mounting member 24, 26 has a spherical portion 28, 30. These spherical portions 28, 30 preferably are movable from about 5° to about 15°, and most preferably about 10°, upon each sidewall-defined entry 34 of each aperture 32. Such movement is illustrated in FIGS. 3 and 4 wherein the illustrated mounting member 24 is repositioned along its spherical curvature. As would be recognized by the skilled artisan, such spherical repositioning is limited in scope only by the diameter of the sidewall-defined entry 34 in conjunction with curvature magnitude of the spherical portions 28, 30.

While the connector assembly 10 here shown can accommodate a connected single component (not shown), it also is capable of accepting two components with connector sites having apertures through which the pin member 42 can pass and reside when in place. Since each end of the pin member 42 is situated within a respective mounting member 24, 26, the arc movement and subsequent multiplanar movement ranges of the mounting members 24, 26 translate to movement the pin member 42 when movement pressure is applied by a connected component. In this manner, each such component can experience an independent movement pattern while secured by one clevis assembly 10.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A spherical clevis assembly comprising:
   a) a generally U-shaped member having two generally parallel opposing arms and a base;
   b) two opposing inwardly disposed mounting members each having a spherical portion situated in, extending inwardly from, and arcuately movable within a respective aperture structure of the respective parallel arm of the U-shaped member, wherein each aperture structure has a sidewall-defined entry of a diameter less than an adjacent curvature of the spherical portion of the mounting member such that said spherical portion rides upon said sidewall-defined entry to thereby be arcuately movable in axes in accord with the adjacent curvature of said spherical portion; and
   c) a releasable pin member extending between the mounting members.

2. A spherical clevis assembly as claimed in claim 1 having in addition a rod member extending outwardly from the base of the generally U-shaped member.

3. A spherical clevis assembly as claimed in claim 2 wherein the rod member is threaded.

4. A spherical clevis assembly as claimed in claim 1 wherein the spherical portion of the mounting member is movable from about 5° to about 15° upon each sidewall-defined entry of each aperture structure.

5. A spherical clevis assembly as claimed in claim 4 wherein the spherical portion of the mounting member is movable about 10°.

6. A spherical clevis assembly as claimed in claim 1 wherein the sidewall of at least one sidewall-defined entry is formed as an arc complimentary in curvature to the spherical portion of the mounting member.

* * * * *

UNITED STATES PATENT AND TRADEMARK OFFICE
CERTIFICATE OF CORRECTION

PATENT NO.    : 6,350,074 B1
DATED         : February 26, 2002
INVENTOR(S)   : Borges et al.

It is certified that error appears in the above-identified patent and that said Letters Patent is hereby corrected as shown below:

<u>Title page,</u>
Insert -- [*] Notice: Under 35 U.S.C. 154(b), the term of this patent shall be extended for 62 days. --.

Signed and Sealed this

Twenty-fifth Day of March, 2003

JAMES E. ROGAN
*Director of the United States Patent and Trademark Office*